United States Patent
Emaminouri et al.

(10) Patent No.: US 9,680,812 B1
(45) Date of Patent: Jun. 13, 2017

(54) ENROLLING A USER IN A NEW AUTHENTICATION PROCDURE ONLY IF TRUSTED

(71) Applicant: EMC Corporation, Hopkinton, MA (US)

(72) Inventors: Mohsen Emaminouri, San Francisco, CA (US); Yedidya Dotan, Newton, MA (US); Vadim Bruk, Foster City, CA (US); Andrew Luke, San Francisco, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 353 days.

(21) Appl. No.: 14/227,502

(22) Filed: Mar. 27, 2014

(51) Int. Cl.
*G06F 21/00* (2013.01)
*H04L 29/06* (2006.01)

(52) U.S. Cl.
CPC .......... *H04L 63/08* (2013.01); *H04L 63/0861* (2013.01)

(58) Field of Classification Search
None
See application file for complete search history.

(56) References Cited

U.S. PATENT DOCUMENTS

| | | | |
|---|---|---|---|
| 7,603,565 B2 * | 10/2009 | Baird, III | H04L 63/083 713/183 |
| 8,438,617 B2 | 5/2013 | Brainard et al. | |
| 8,572,391 B2 | 10/2013 | Golan et al. | |
| 8,627,421 B1 | 1/2014 | Bowers et al. | |
| 2004/0039909 A1 * | 2/2004 | Cheng | G06F 21/32 713/169 |
| 2005/0021975 A1 * | 1/2005 | Liu | H04L 63/0281 713/182 |
| 2008/0115198 A1 * | 5/2008 | Hsu | G06F 21/31 726/5 |
| 2014/0096177 A1 * | 4/2014 | Smith | H04L 63/08 726/1 |
| 2014/0366128 A1 * | 12/2014 | Venkateswaran | H04L 63/08 726/19 |
| 2016/0087957 A1 * | 3/2016 | Shah | H04L 63/205 726/1 |

* cited by examiner

Primary Examiner — Jeffrey Williams
(74) Attorney, Agent, or Firm — BainwoodHuang

(57) ABSTRACT

A technique is directed to operating an authentication system. The technique involves receiving an enrollment request to enroll a user in a new authentication procedure in place of an earlier-established authentication procedure. The earlier-established authentication procedure is operative to authenticate the user at a first security level within a range of security levels. The new authentication procedure is operative to authenticate the user at a second security level within the range of security levels, the first security level being at least as high as the second security level within the range of security levels. The technique further involves, in response to the enrollment request, initiating the earlier-established authentication procedure to authenticate the user. The technique further involves, in response to completion of the earlier-established authentication procedure, performing an authentication enrollment operation associated with the new authentication procedure.

23 Claims, 5 Drawing Sheets

| Procedure ID Field 114 | Combination of Authentication Factors Field(s) 116 | Security Strength Field 118 | Other Field(s) 120 |
|---|---|---|---|
| 1 | User ID + Alphanumeric Password + Retina | High | ... |
| 2 | User ID + Alphanumeric Password + OTP | High | ... |
| 3 | User ID + Alphanumeric Password + Geo-location | High | ... |
| ... | ... | ... | ... |
| 11 | User ID + Alphanumeric Password + Voice | Medium | ... |
| 12 | User ID + Alphanumeric Password + Face | Medium | ... |
| 13 | User ID + 4-Digit Passcode + Geo-location | Medium | ... |
| ... | ... | ... | ... |
| 21 | User ID + 4-Digit Passcode + Voice | Low | ... |
| 22 | User ID + 4-Digit Passcode + Face | Low | ... |
| 23 | User ID + Thumb scan + Face | Low | ... |
| ... | ... | ... | ... |

FIG. 3

ENROLLING A USER IN A NEW AUTHENTICATION PROCDURE ONLY IF TRUSTED

BACKGROUND

For a human user to access certain protected resources on a smart device, the human user may need to authenticate by providing a variety of authentication factors to demonstrate that the human user is legitimate (i.e., to show that the human user is truly the person authorized to access the protected resources using the smart device). If the human user supplies authentication factors which match expected authentication factors, authentication is considered successful and the human user is allowed to access the protected resources using the smart device. However, if the human user supplies authentication factors which do not match the expected authentication factors, authentication is considered unsuccessful and the human user is denied access the protected resources using the smart device.

Some conventional authentication systems allow the human user to set different security levels for different smart device apps. For example, the human user may impose the need for a one-time passcode (OTP) in order to access a bank account app on the human user's smart device. As another example, the human user may impose the need for facial recognition to access a camera app or to make a cellular phone call on the human user's smart device. A product which is similar to the conventional authentication systems described above is Passboard which is offered by PassBan, i.e., a part of EMC Corporation of Hopkinton, Mass.

SUMMARY

Unfortunately, there may be certain weaknesses in conventional authentication systems. For example, a conventional authentication system, which allows a human user to set different security levels for different smart device apps, may not force the human user to successfully authenticate before enrolling the human user in a new authentication method (e.g., voice recognition, face recognition, etc.). Without a secure process for enrollment, the strength of the new authentication method is reduced significantly.

Additionally, even if successful authentication is a requirement for new authentication method enrollment, enrollment may still provide a security weak point if the security strength of such authentication is relatively low. For example, simply requiring the human user to provide a low risk score based on risk-based authentication may be inappropriate if the human user is trying to enroll in higher security authentication method such as one requiring a retina scan.

In contrast to the above-described conventional authentication systems which do not require authentication prior to enrollment or which may provide security weak points prior to enrollment, improved techniques are directed to enrolling users in new authentication procedures only after the users have authenticated using earlier-established procedures which are at least as strong as the new authentication procedures. For example, if a user wishes to set up a new authentication procedure which requires a password and a facial scan, the user may be required to authenticate using a password and a one-time passcode from a hardware token in the user's possession prior to facial scan enrollment if authentication using such combinations of authentication factors are defined to have the same security strength. Such techniques provide secure processes for enrollment thus preserving the strength of the new authentication procedures. Moreover, the various strengths and security levels associated with different combinations of authentication factors can be easily defined by a set of rules or policies.

One embodiment is directed to a method of operating an authentication system. The method includes receiving, by processing circuitry of the authentication system, an enrollment request to enroll a user in a new authentication procedure in place of an earlier-established authentication procedure. The earlier-established authentication procedure is operative to authenticate the user at a first security level within a range of security levels. The new authentication procedure is operative to authenticate the user at a second security level within the range of security levels, the first security level being at least as high as the second security level within the range of security levels. The method further includes, in response to the enrollment request, initiating, by the processing circuitry, the earlier-established authentication procedure to authenticate the user. The method further includes, in response to completion of the earlier-established authentication procedure, performing, by the processing circuitry, an authentication enrollment operation associated with the new authentication procedure.

In some arrangements, the earlier-established authentication procedure authenticates the user based on a first combination of multiple authentication factors. In these arrangements, the new authentication procedure authenticates the user based on a second combination of multiple authentication factors which is different than the first combination of multiple authentication factors. Additionally, initiating the earlier-established authentication procedure includes (i) acquiring the first combination of multiple authentication factors and (ii) providing a first combination authentication result indicating whether the user has successfully authenticated based on the first combination of multiple authentication factors.

In some arrangements, the method further includes, prior to receiving the enrollment request, inputting security strength policies into the authentication system. The security strength policies define (i) the range of security levels, (ii) that successful authentication using the earlier-established authentication procedure provides a first security strength within the range of security levels, and (iii) that successful authentication using the new authentication procedure provides a second security strength within the range of security levels, the first security strength being at least as strong as the second security strength within the range of security levels.

In some arrangements, the method further includes, after performing the authentication enrollment operation associated with the new authentication procedure, receiving an authentication request. In these arrangements, the method further includes, in response to the authentication request, initiating the new authentication procedure to determine whether a source of the authentication request is authentic, the new authentication procedure (i) acquiring, from the source, the second combination of authentication factors and (ii) generating a second combination authentication result indicating whether the source has successfully authenticated based on the second combination of authentication factors.

In some arrangements, acquiring the first combination of multiple authentication factors includes obtaining a user location identifier which identifies a geographic location of the user during performance of the earlier-established authentication procedure. The first combination authentication result is based, at least in part, on the user location identifier which identifies the geographic location of the user during performance of the earlier-established authentication procedure.

In some arrangements, acquiring the first combination of multiple authentication factors further includes obtaining an authentication location identifier which identifies a geographic location of where the earlier-established authentication procedure is performed. The first combination authentication result is based, at least in part, on the authentication location identifier which identifies where the earlier-established authentication procedure is performed.

In some arrangements, obtaining the user location identifier includes receiving global satellite positioning (GPS) data from a GPS circuit of a mobile device in possession of the user. The GPS data identifies the geographic location of the user during performance of the earlier-established authentication procedure.

In some arrangements, the first combination of authentication factors includes (i) a user identifier which correctly identifies the user among other users, (ii) a current one-time passcode provided by a hardware authentication token apparatus in possession of the user, the current one-time passcode correctly matching an expected one-time passcode associated with the user by the authentication system, and (iii) a current biometric reading which correctly matches an expected biometric reading associated with the user by the authentication system. In these arrangements, providing the first combination authentication result includes indicating that the user has successfully authenticated based on the first combination of multiple authentication factors.

In some arrangements, the first combination of authentication factors includes (i) a user identifier which correctly identifies the user among other users, (ii) a current one-time passcode provided by a hardware authentication token apparatus in possession of the user, the current one-time passcode correctly matching an expected one-time passcode associated with the user by the authentication system, and (iii) a current user location identifier which indicates that the user is currently in a safe location designated by the authentication system. In these arrangements, providing the first combination authentication result includes indicating that the user has successfully authenticated based on the first combination of multiple authentication factors.

In some arrangements, the first combination of authentication factors includes (i) a user identifier which correctly identifies the user among other users, (ii) a current one-time passcode provided by a hardware authentication token apparatus in possession of the user, the current one-time passcode correctly matching an expected one-time passcode associated with the user by the authentication system, and (iii) a current parameter indicating that the user has provided low risk behavior for a predefined amount of time prior to receiving the enrollment request. In these arrangements, providing the first combination authentication result includes indicating that the user has successfully authenticated based on the first combination of multiple authentication factors.

In some arrangements, the first combination of multiple authentication factors includes voice biometrics and does not include face biometrics. In these arrangements, the second combination of multiple authentication factors includes face biometrics and does not include voice biometrics.

In some arrangements, the second combination of multiple authentication factors includes voice biometrics and does not include face biometrics. In these arrangements, the first combination of multiple authentication factors includes face biometrics and does not include voice biometrics.

In some arrangements, the first combination authentication result indicates that the user has unsuccessfully authenticated based on the first combination of multiple authentication factors. In these arrangements, performing the authentication enrollment operation includes, in response to completion of the earlier-established authentication procedure, performing a faux authentication enrollment operation associated with the new authentication procedure to prevent user enumeration by the authentication system.

Another embodiment is directed to an electronic apparatus which includes a network interface, memory, and control circuitry coupled to the network interface and the memory. The memory stores instructions which, when carried out by the control circuitry, cause the control circuitry to:
  (A) receive, through the network interface, an enrollment request to enroll a user in a new authentication procedure in place of an earlier-established authentication procedure, the earlier-established authentication procedure being operative to authenticate the user at a first security level within a range of security levels, the new authentication procedure being operative to authenticate the user at a second security level within the range of security levels, the first security level being at least as high as the second security level within the range of security levels,
  (B) in response to the enrollment request, initiate the earlier-established authentication procedure to authenticate the user, and
  (C) in response to completion of the earlier-established authentication procedure, perform an authentication enrollment operation associated with the new authentication procedure.

Yet another embodiment is directed to a computer program product having a non-transitory computer readable medium which stores a set of instructions to operate an authentication system. The set of instructions, when carried out by computerized circuitry, cause the computerized circuitry to perform a method of:
  (A) receiving an enrollment request to enroll a user in a new authentication procedure in place of an earlier-established authentication procedure, the earlier-established authentication procedure being operative to authenticate the user at a first security level within a range of security levels, the new authentication procedure being operative to authenticate the user at a second security level within the range of security levels, the first security level being at least as high as the second security level within the range of security levels,
  (B) in response to the enrollment request, initiating the earlier-established authentication procedure to authenticate the user, and
  (C) in response to completion of the earlier-established authentication procedure, performing an authentication enrollment operation associated with the new authentication procedure.

It should be understood that, in the cloud context, certain computing circuitry (e.g., circuitry forming at least a portion of an authentication server) is formed by remote computer resources distributed over a network. Such a context is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in enrolling a user in a new authentication procedure only if trusted.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 3 is a block diagram of an example set of policies which defines levels of security strength imposed by the electronic environment of FIG. 1.

DETAILED DESCRIPTION

An improved technique is directed to enrolling a user in a new authentication procedure only after the user has authenticated using an earlier-established procedure which is at least as strong as the new authentication procedure. Along these lines, if a user wishes to set up a new authentication procedure which requires a user password and a facial scan, the user may be required to authenticate using a user password and a one-time passcode from a hardware token in the user's possession prior to facial scan enrollment (i.e., the user must first establish trust which is at least as strong as that provided by the new authentication procedure). Such a technique provides a secure process for enrollment thus maintaining the strength of the new authentication procedure. Moreover, the different strengths and security levels associated with various combinations of authentication factors can be easily defined and enforced by policies (or rules).

Figure 1:
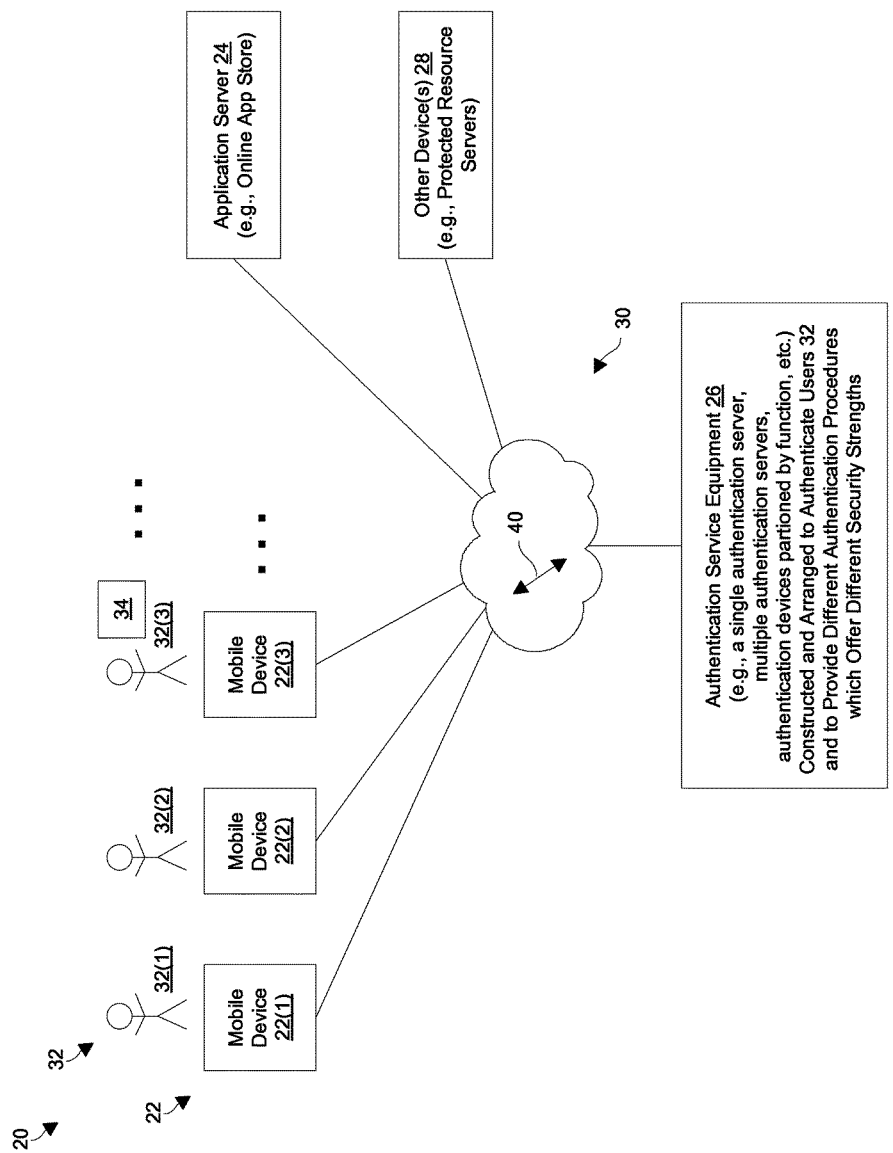
FIG. 1 is a block diagram of an electronic environment which is suitable for enrolling users in new authentication procedures while preserving the integrity of the authentication system.

FIG. 1 shows an electronic environment 20 which is suitable for enrolling a user in a new authentication procedure while preserving the strength of the new authentication procedure. The electronic environment 20 includes mobile devices 22(1), 22(2), 22(3), ... (collectively, mobile devices 22), an application server 24, authentication service equipment 26, other device(s) 28, and communications medium 30.

Each mobile device 22 is controlled and operated by a respective user 32. For example, the mobile device 22(1) is controlled by the user 32(1). Likewise, the mobile device 22(2) is controlled by the user 32(2), the mobile device 22(3) is controlled by the user 32(3), and so on. One or more of the users 32 may have a personally issued hardware authentication token apparatus 34 available to issue one-time use passcodes (OTPs), e.g., see the user 32(3) in FIG. 1.

The mobile devices 22 are constructed and arranged to enable respective users 32 to perform useful work (e.g., access files, use email, perform online transactions, play games, communicate with other users, etc.). During such activity, the users 32 of the mobile devices 22 may need to authenticate with the authentication service equipment 26. As will be explained in further detail shortly, the various components of the electronic environment 20 enable the users 32 to enroll in new authentication procedures while preserving security strength.

The application server 24 is constructed and arranged to offer and distribute applications (or apps) to the mobile devices 22. Such applications may include authentication applications, applications to access protected resources (e.g., banking applications, enterprise applications, online store application, browsers, etc.), other applications (e.g., free apps, utilities, etc.), and so on. In some arrangements, the application server 24 is an online app store which offers users a variety of applications to its customers (e.g., the users 32 of mobile devices 22).

The authentication service equipment (or the simply authentication server) 26 is constructed and arranged to authenticate the users 32 (e.g., a single authentication server, a farm of servers, devices partitioned by function, etc.). Such authentication may be required for the users 32 to access certain protected resources such as content locally stored on their smart devices and remote resources (e.g., see the other devices 28). Additionally, the authentication server 26 is constructed and arranged to provide different authentication procedures which offer different security strengths. As will be explained in further detail shortly, enrollment in a new authentication procedure requires authentication via an earlier-established authentication procedure of at least equal security strength in order to prevent compromising the new authentication procedure and reducing the implicit strength of the new authentication procedure.

The other devices 28 represent additional apparatus of the electronic environment 20 which may are may not be involved in authentication. For example, the other devices 28 may include resource servers which access the authentication server 26 to successfully authenticate users 32 prior to allowing the users 32 to access protected resources such as sensitive files and other content, email, VPN access and other enterprise resources, transactions, games, online shopping resources, financial accounts, etc. The other devices 28 may also represent other entities on the Internet (e.g., resource servers which do not require authentication, hackers, malicious devices, etc.).

The communications medium 30 is constructed and arranged to connect the various components of the electronic environment 20 together to enable these components to exchange electronic signals 40 (e.g., see the double arrow 40). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

During operation, the users 32 operate their respective mobile devices 22 to perform useful work. In order to access certain protected resources (e.g., local resources such as mobile apps on the mobile devices 22, remote resources such as those on protected resource servers, etc.), the users 32 must successfully authenticate to the authentication server 26.

Depending on the particular protected resource or on how authentication is setup (e.g., by an enterprise), the user 32 may have the choice of (i) continuing to use an earlier-established authentication procedure or (ii) transitioning to a new authentication procedure in lieu of the earlier-established authentication procedure. For example, a user 32 may wish to substitute supplying a first combination of authentication factors such as a user identifier (or ID), a password, and a one-time use passcode (OTP) from a hardware token or other device 34 in the user's possession (see the user 32(3) in FIG. 1), with a new combination of authentication factors such as the user ID, the password, and a voice biometric. Other combinations are suitable for use as well such as ones which include personal identification numbers (PINs), other biometrics (e.g., facial recognition, fingerprint recognition, etc.), geo-location, motion, and so on.

When transitioning from an earlier-established authentication procedure to a new authentication procedure, enrollment in the new authentication procedure requires a level of trust. There are a variety of ways of obtaining this level of trust such as authenticating using the earlier-established authentication procedure provided that the security provided by the earlier-established authentication procedure is at least as strong as that of the new authentication procedure. Alternatively, the user 32 can visit a human IT specialist who will verify authenticity of the user 32, but such an alternative can be burdensome, may be susceptible to human error or fraud, and may be prone to inconsistencies. Accordingly, automatic enrollment using an equally strong or stronger form of authentication can be advantageous and more reliable. Further details will now be provided with reference to FIG. 2.

Figure 2:
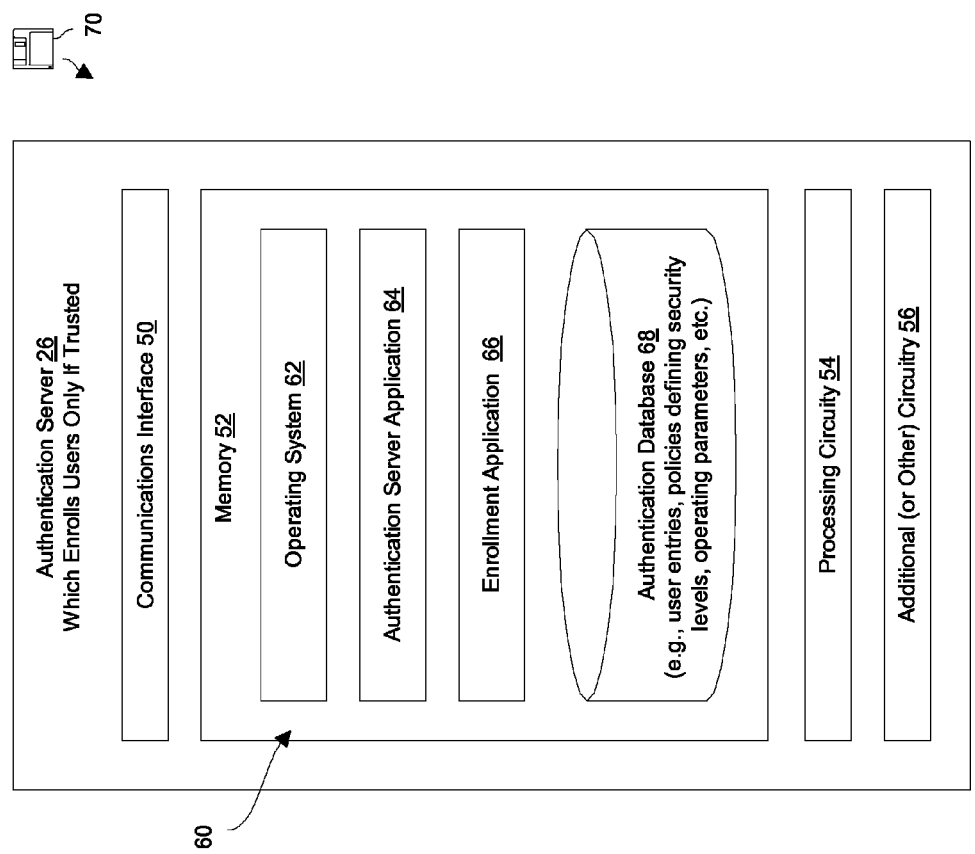
FIG. 2 is a block diagram of authentication service equipment of the electronic environment of FIG. 1.

FIG. 2 shows particular details of the authentication server 26 (also see FIG. 1). The authentication server 26 includes a communications interface 50, memory 52, processing circuitry 54, and additional (or other) circuitry 56.

The communications interface 50 is constructed and arranged to connect the authentication server 26 to the communications medium 30 to enable communications with other components of the electronic environment 20 (FIG. 1). Such communications may be IP-based, cellular-based, cable-based, combinations thereof, and so on. Accordingly, the communications interface 50 enables the authentication server 26 to communicate with the mobile devices 22 and other devices 28 to perform user authentication, and so on.

The memory 52 is intended to represent both volatile storage (e.g., DRAM, SRAM, etc.) and non-volatile storage (e.g., flash memory, etc.). The memory 52 stores a variety of software constructs 60 including an operating system 62 to manage resources of the authentication server 26, a specialized authentication server application 64 to perform user authentication, an enrollment application 66 to enroll users 32 in new authentication procedures, and an authentication database 68 to control authentication. The authentication database 68 includes entries associated with the users 32 (e.g., user information, user profiles, authentication factors and parameters, seed information, etc.), policies defining security levels (e.g., rules associating certain combinations of authentication factors with security strength, parameters indicating which users 32 or groups of users 32 are allowed to use certain types of authentication procedures, etc.), and other operating parameters (e.g., risk engine details and machine learning logic, authentication statistics, configuration data, etc.).

The processing circuitry 54 is constructed and arranged to operate in accordance with the various software constructs 60 stored in the memory 52. Such circuitry 54 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 70 is capable of delivering all or portions of the software constructs 60 to the authentication server 26. The computer program product 70 has a non-transitory (or non-volatile) computer readable medium which stores a set of instructions which controls one or more operations of the authentication server 26. Examples of suitable computer readable storage media include tangible articles of manufacture and apparatus which store instructions in a non-volatile manner such as CD-ROM, flash memory, disk memory, tape memory, and the like.

The additional circuitry 56 represents other portions of the authentication server 26. For example, the authentication server 26 may include a user interface to enable a user such as an administrator to enter input and receive output (user I/O) to operate the authentication server 26, specialized circuitry to acquire user biometrics during in-person visits, and so on.

During operation, the processing circuitry 64 runs the authentication application 64 and the enrollment application 66 to form specialized control circuitry to perform various authentication server operations. For example, when the processing circuitry 54 runs the authentication application 64, the specialized control circuitry performs authentication operations to authenticate users of the mobile devices 22. Additionally, when the processing circuitry 54 runs the enrollment application 66, the specialized control circuitry may acquire certain information (e.g., biometric data) from a user 32 for use in a new authentication procedure.

It should be understood that proper enrollment requires the user 32 to successfully authenticate using an earlier-established authentication procedure which is at least equally as strong from a security standpoint. Such operation provides a secure process for enrollment by maintaining the strength of the new authentication procedure. If authentication using the using the earlier-established authentication procedure is unsuccessful, the user 32 is not properly enrolled to authenticate using the new authentication procedure.

In some arrangements, if the user 32 fails to successfully authenticate, the authentication server 26 nevertheless performs a faux authentication enrollment operation which simulates the actual authentication enrollment operation. Such faux operation prevents user enumeration by the authentication system. That is, a hacker cannot successfully guess who the true participants of the authentication system are, and so on by sampling differences in the behavior of the authentication server 26. Further details will now be provided with reference to FIG. 3.

FIG. 3 shows an example set of policies 100 which defines various combinations of authentication factors and security strength levels associated with these combinations, as imposed by the authentication server 26 (also see the database 68 in FIG. 2). Each policy 100 includes a procedure identification field 114 to hold a procedure ID which uniquely identifies a particular authentication procedure, a combination of authentication factors field (or fields) 116 to hold parameters which identify a particular combination of authentication factors used by that authentication procedure, and a security strength field 118 to hold a value indicating a security strength of that that authentication procedure within a range of security strength levels (e.g., extending from low to high).

For example, the policy 100(1) indicates that the combination of a user ID, an alphanumeric password, and a retina scan provides high security strength (i.e., procedure #1). Similarly, the policy 100(2) indicates that the combination of a user ID, an alphanumeric password, and a one-time use passcode from a hardware authentication token 34 provides high security strength (i.e., procedure #2). Furthermore, the policy 100(3) indicates that the combination of a user ID, an alphanumeric password, and a particular geo-location (i.e., the user authenticates from a location that is deemed to be a safe zone) provides high security strength (i.e., procedure #3). Accordingly, the users 32 that successfully authenticate by supplying any of the combinations of authentication factors for procedures #1 through #3 have strongly authenticated (i.e., are very likely to be the legitimate users).

Additionally, the policy 100(11) indicates that the combination of a user ID, an alphanumeric password, and voice recognition provides medium security strength (i.e., weaker than high security strength). Likewise, the policy 100(12) indicates that the combination of a user ID, an alphanumeric password, and face recognition provides medium security strength. Also, the policy 100(13) indicates that the combination of a user ID, a 4-digit passcode, and a particular geo-location provides medium security strength.

Furthermore, the policy 100(21) indicates that the combination of a user ID, a 4-digit passcode, and voice recognition provides low security strength (i.e., weaker than medium security strength). The policy 100(22) indicates that the combination of a user ID, a 4-digit passcode, and face recognition provides low security strength. Similarly, the policy 100(23) indicates that the combination of a user ID, a thumb scan, and face recognition provides low security strength, and so on.

It should be understood that the policies 100 are customizable, and that the particular policies 100 in FIG. 3 are provided by way of example only. Additionally, a human administrator can create a new policy 100 by simply identifying a particular combination of authentication factors (e.g., in the combination field 116 of a new entry 100) and associating a particular security strength to that combination. Moreover, using the other fields 120 of the entries 100, a particular combination can be considered to provide relatively strong security for a particular user 32 or for users 32 of one entity (i.e., an enterprise, an organization, etc.), but relatively weak security for another user 32 or other users 32 of another entity, and vice versa.

Example authentication factors that are suitable for use include user IDs, alphanumeric passwords, PINs, OTPs, biometrics, geo-location, risk scores, motion, and answers to knowledge based authentication (KBA) questions. Other authentication factors are suitable for use as well.

Example security strengths include low, medium, and high. The authentication system is capable of using higher (or lower) precision instead (e.g., very low, low, moderate, high, very high, etc.). In some arrangements, the security strength fields 118 hold numerical security strength values which operate as weights (or scores) defining points along a continuous range of security levels (e.g., normalized security strength values within a range from 0 to 100, etc.).

Additionally, it should be understood that each policy 100 can hold additional information in other fields 120. For example, other fields 120 may hold parameters indicating that certain policies must be followed or not followed by certain users 32 or groups of users 32 (e.g., participants of an enterprise, an organization, etc.), parameters indicating whether faux enrollment should be performed in response to unsuccessful authentication to avoid user enumeration, and so on. Further details will now be provided with reference to FIG. 4.

Figure 4:
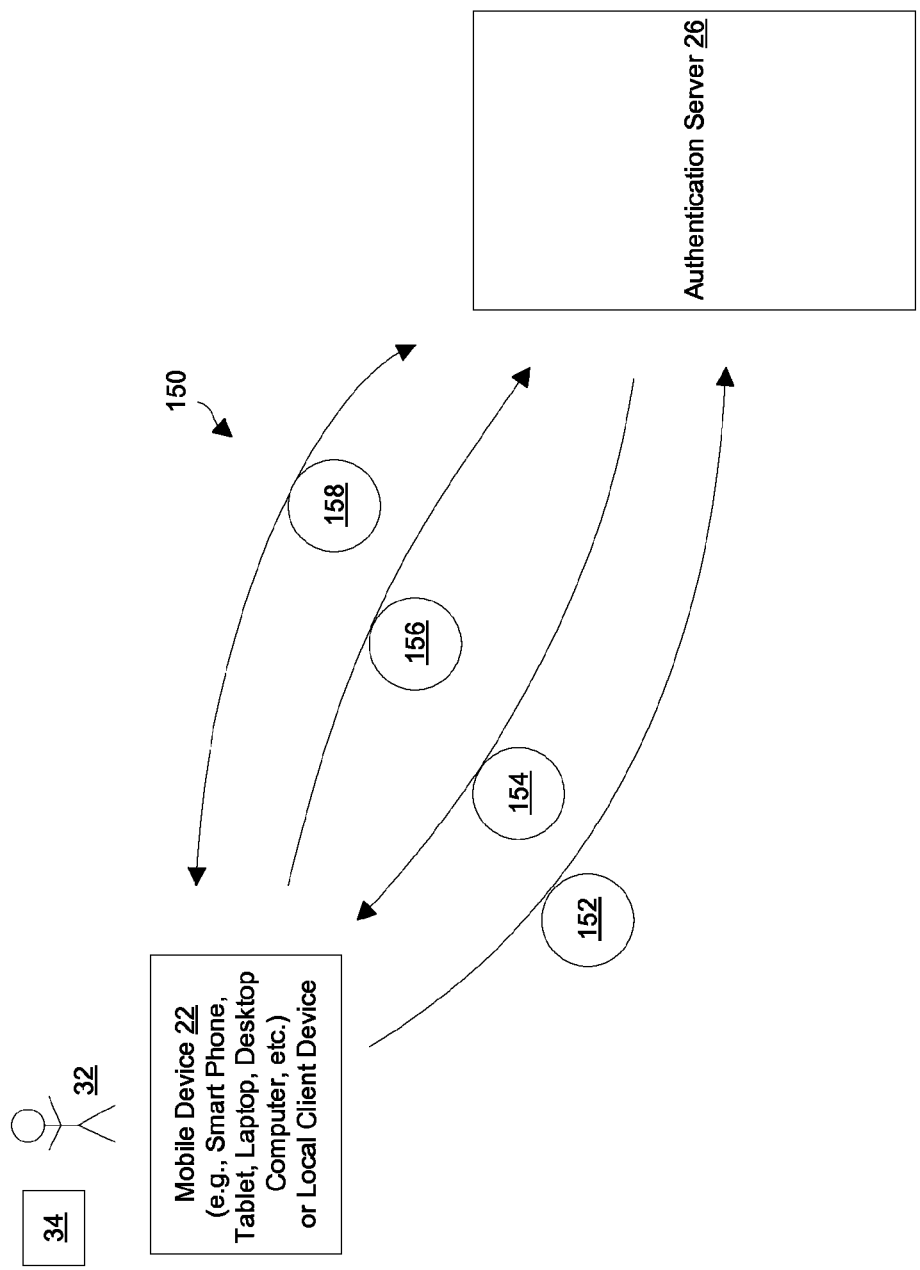
FIG. 4 is a diagram illustrating an exchange between a user and the electronic environment of FIG. 1 during an enrollment process.

FIG. 4 shows suitable interactions 150 between a user 32 and the authentication server 36 when attempting to enroll in a new authentication procedure. For a user 32 to enroll in the new authentication procedure, the user 32 must initially authenticate using an earlier-established authentication procedure which is at least as strong as the new authentication procedure. Such operation avoids compromising the authentication process and maintains the implicit strength of the authentication system.

First, the user 32 submits an enrollment request to the authentication server 26 (arrow 152). The user 32 may submit the enrollment request via the user's mobile device 22 through the communications medium 30 (also see FIG. 1), or via a local client device within a safe location (e.g., a computer or specialized apparatus at an office facility, etc.) which is deemed to be suitable (e.g., by policy).

The authentication server 26 responds by challenging the user 32 to successfully authenticate using an earlier-established authentication procedure which is at least as strong as the new authentication procedure (arrow 154). In some arrangements, the user 32 must authenticate using a particular earlier-established authentication procedure identified by the authentication server 26. In other arrangements, the user 32 is able to choose which earlier-established authentication procedure to use among multiple available authentication procedures as long as the earlier-established authentication procedure provides at least the same security strength as that of the new authentication procedure.

Next, the user 32 provides a set of authentication factors (e.g., a user ID, a 4-digit passcode, a password, a OTP from an authentication token 34, biometric scan, KBA answer, etc.) in response to the challenge of the earlier-established authentication procedure (arrow 156). In some situations, the authentication server 26 may include information which is not expressly provided by the user 32 such as a cookie from the user's mobile device 22, time of day, geo-location, motion factors, and so on. In some arrangements, the authentication result is based at least in part on a risk score (i.e., a numerical risk score which indicates a likelihood or measure that the authenticating party is fraudulent).

Upon completion of the earlier-established authentication procedure, the authentication server 26 performs an authentication enrollment operation (arrow 158) associated with the new authentication procedure. In particular, if authentication using the earlier-established authentication procedure is successful, the authentication server 26 performs the enrollment process to enroll the user 32 in the new authentication procedure. However, if authentication using the earlier-established authentication procedure is not successful, the authentication server 26 performs an alternative operation such as a faux enrollment operation associated with the new authentication procedure to avoid user enumeration and exposure of certain operational details of the authentication server 26. Further details will now be provided with reference to a set of examples and with reference to FIGS. 3 and 4.

Enrollment Example 1

Suppose that a user 32 is initially not set up to authenticate using procedure #12, but that the user 32 wishes to use the procedure #12 in the future when accessing a particular protected resource (e.g., an app on the user's mobile device 22, locally stored data, a resource on a remote server 28, etc.). As illustrated by FIG. 3, the procedure #12 requires the user 32 to provide a user ID, an alphanumeric password, and a facial scan as authentication factors and is deemed (e.g., by policy) to provide medium security strength.

To begin enrollment to enable the user 32 to use the procedure #12 in the future for authentication, the user 32 submits an electronic enrollment request to the authentication server 26 using a specialized app on the user's mobile device 22 (arrow 152 in FIG. 4). The authentication server 26 responds to the enrollment request by challenging the user 32 to initially authenticate via the mobile device 22 (arrow 154 in FIG. 4). Such a situation may occur automatically in response to the request thus alleviating the need to involve a human administrator.

For the user 32 to properly enroll with the authentication server 26 using the procedure #12, the user 32 must initially authenticate using a procedure of at least equal security strength. That is, before authentication server 26 processes the user 32 through enrollment to use procedure #12, the authentication server 26 must successfully authenticate the user 32 using another procedure that is at least as high in terms of security strength (i.e., at least as strong) as that of the procedure #12. Accordingly, the authentication server 26 initiates an authentication procedure of at least equal security strength to authenticate the user 32. Otherwise, the underlying security strength that would be provided by procedure #12 would be compromised.

In some arrangements, the user 32 is able to select the particular authentication procedure of at least equal strength. In other arrangements, the authentication server 26 dictates which particular authentication procedure of at least equal strength is required (e.g., based on policy).

Along these lines, suppose that the user 32 has already enrolled in another procedure which is at least as strong from a security perspective and is thus able to authenticate via that procedure. In particular, suppose that the user 32 currently resides in a geo-location that has been deemed (e.g., via policy) to be in a safe zone (e.g., at an office facility, at a home location, etc.). The user 32 may then authenticate with the authentication server 26 via a procedure which includes geo-location as an authentication factor among other authentication factors (arrow 156 in FIG. 4). Here, the user 32 may authenticate using the procedure #3 by supplying a user ID, an alphanumeric password, and the current geo-location (e.g., using GPS circuitry within the user's mobile device 22, using an IP address associated with the user's location, etc.) since the procedure #3 has a security strength (i.e., high) which is at least as strong as that of the procedure #12 (i.e., medium). Alternatively, the user 32 may authenticate with the authentication server 26 via the procedure #13 by supplying a user ID, a 4-digit passcode, and the current geo-location since the procedure #13 has a security strength (i.e., medium) which is at least as strong as that of the procedure #12 (i.e., medium).

If the user 32 is not in a safe location, the user 32 may still be able to successfully authenticate with the authentication server 26 using a procedure which is at least as strong. Along these lines, the user 32 can authenticate using the procedure #1 by providing a user ID, an alphanumeric password and a retina scan (e.g., via special scanning hardware) or the procedure #2 by providing a user ID, an alphanumeric password and a OTP (e.g., from a hardware authentication token apparatus) since such procedures have security strengths which are stronger than that of the procedure #12.

Furthermore, the user 32 can authenticate using the procedure #11 by providing a user ID, an alphanumeric password and a voice scan since the procedure #11 provides medium security strength, and so on.

However, it should be understood that the authentication server 26 does not permit the user 32 to properly enroll in the procedure #12 by initially enrolling in a procedure of less security strength such as the procedures #21, #22, or #23. Accordingly, the implicit strength of the various authentication procedures offered by the authentication system is maintained.

Once the user 32 has successfully authenticated using an earlier-establish authentication procedure of at least the same security strength, the authentication server 26 performs an authentication enrollment operation (arrow 158 in FIG. 4) to enroll the user 32 so that the user 32 is able to use the procedure #12 to authenticate. For example, in the context of facial recognition, the authentication server 26 may instruct the user 32 to aim a camera of the user's mobile device 22 at the user's face and then capture and submit several facial images of the user 32. As a result, the authentication server 26 is able to evaluate the facial images (e.g., by measuring and extracting certain facial characteristics to develop a facial profile for the user 32), and then perform authentication based on facial recognition in the future.

Once the user has completed the authentication enrollment operation, the user 32 can authenticate using the procedure #12 in order to access the protected resource. It should be understood that since the procedure #12 provides a security strength of medium, the user 32 is also able to subsequently authenticate using the procedure #12 prior to enrolling in another authentication procedure that has a security strength of medium or lower.

In some arrangements, if the authentication server 26 could not successfully authenticate the user via the earlier-establish authentication procedure (i.e., authentication fails), the authentication server 26 may still appear to perform an authentication enrollment operation associated with the procedure #12 in order to avoid user enumeration, i.e., to prevent or slow an attacker from being able to test the abilities and expose other information of the authentication server 26 by trying to authenticate and then enroll as the legitimate user 32. Rather, the authentication server 26 may prompt the attacker to complete the enrollment process even though the attacker is merely participating in a faux enrollment process.

Enrollment Example 2

Suppose that a user 32 is only set up to authenticate using procedure #22 by providing a user ID, a 4-digit passcode, and a set of images for facial recognition. Since the security strength of the procedure #22 is defined as low, the authentication system only permits the user to enroll in another procedure that is also of the same security strength or lower. That is, the user 32 can authenticate using the procedure #22 and then enroll in procedure #21 (i.e., a combination of user ID, a 4-digit passcode, and voice recognition). Additionally, the user 32 can authenticate using the procedure #22 and then enroll in procedure #23 (i.e., a combination of user ID, a thumb scan, and face recognition).

However, the authentication server 26 does not allow the user 32 to authenticate using the procedure #22 and then enroll in a procedure with a higher security strength such as authentication procedures #1, #2, #3, #11, #12 and #13. Accordingly, the implicit strength of the authentication system is preserved.

Enrollment Example 3

Suppose that a user 32 is already set up to authenticate using the procedure #11 and the procedure #22. In particular, the user 32 has been routinely using the authentication system to authenticate to a medium level of security by providing a user ID, an alphanumeric password, and voice recognition (the procedure #11) to access certain protected resources. Likewise, the user 32 has been routinely using the authentication system to authenticate to a low level of security by providing a user ID, 4-digit passcode, and face recognition (the procedure #22) to access other protected resources.

Now, suppose that the user 32 wishes to authenticate using the procedure #21 in order to access the other protected resources that the uses accesses using the procedure #22. Since the authentication server 26 is already set up to authenticate the user 32 based on voice recognition for the procedure #11 and the security level of the procedure #22 is at least as high as that for the procedure #21, the user 32 simply indicates that the user 32 wishes to now use the procedure #21 in place of the procedure #22. The authentication server 26 responds by using the procedure #21 when controlling access to the other protected resources. Such operation alleviates the need for the user 32 to repeat the voice recognition enrollment process (which may be extensive in some arrangements) in order to set up use of the procedure #21 since the process for voice recognizing the user 32 already exists.

It should be understood that, even in this situation, the user 32 is enrolled in the new authentication procedure only if the user 32 is trusted. That is, the user 32 must successfully authenticate using the an earlier-established authentication procedure (e.g., the procedure #11 or the procedure #22) having at least the same or higher security strength, before allowing the user 32 to use the new authentication procedure when accessing the other protected resources in the future.

Further Details

Figure 5:
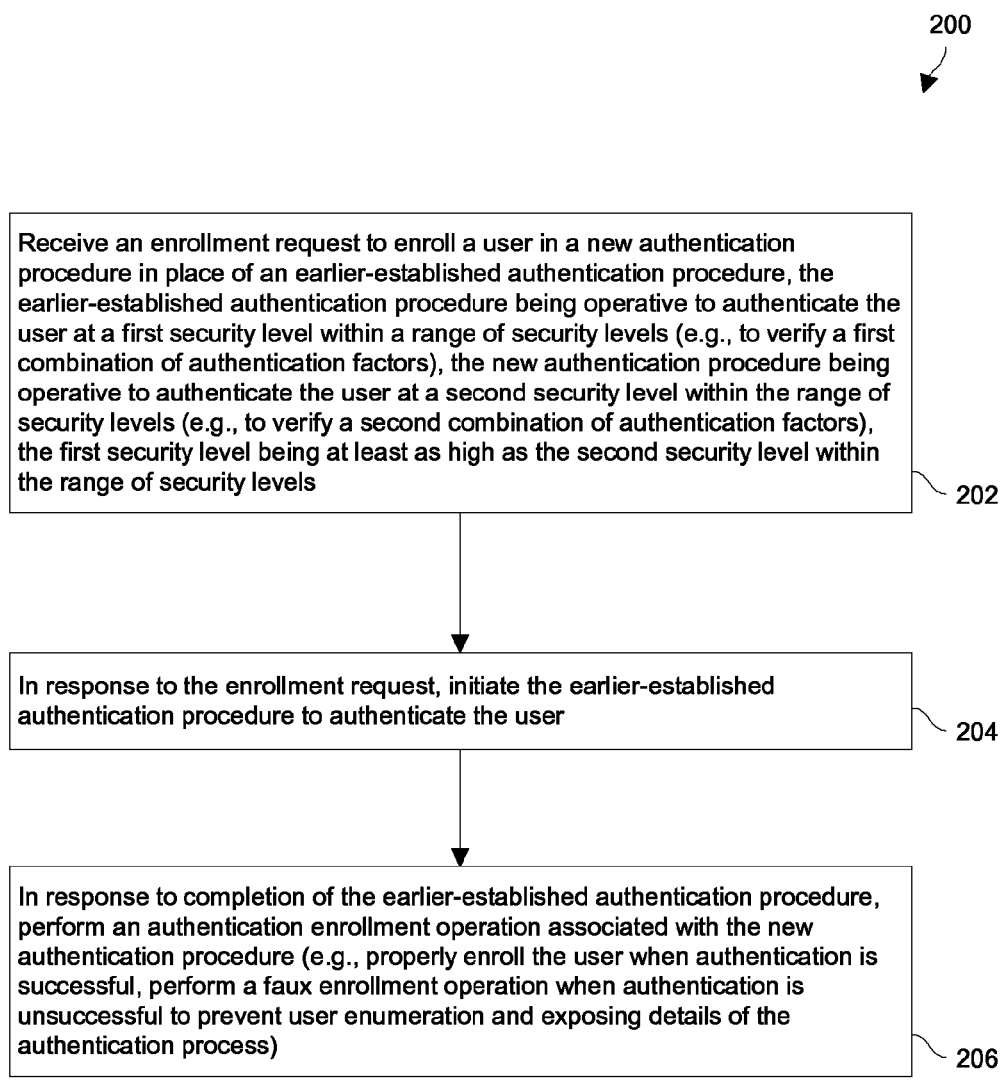
FIG. 5 is a flowchart of a procedure which is performed by the electronic environment of FIG. 1.

FIG. 5 is a flowchart of a procedure 200 which is performed by the authentication server 26 to enroll a user 32 only if the user 32 is trusted. Such operation maintains the overall integrity of the authentication system.

At 202, the authentication server 26 (FIG. 2) receives an enrollment request to enroll a user in a new authentication procedure in place of an earlier-established authentication procedure. The earlier-established authentication procedure is operative to authenticate the user at a first security level within a range of security levels (e.g., a level of security defined by policy and derived from a first combination of authentication factors). The new authentication procedure is operative to authenticate the user at a second security level within the range of security levels (e.g., a level of security defined by policy and derived from a second combination of authentication factors).

At 204, the authentication server 26 initiates the earlier-established authentication procedure to authenticate the user in response to the enrollment request. For example, if the security level of new procedure is medium, the authentication server 26 attempts to authenticate the user 32 using an earlier-established authentication procedure which provides at least the same level of security strength, i.e., medium, or stronger.

At 206, in response to completion of the earlier-established authentication procedure, the authentication server 26 performs an authentication enrollment operation associated with the new authentication procedure. In particular, when authentication using the earlier-established authentication procedure is successful, the authentication server 26 performs an enrollment operation to enable the user to authenticate using the new authentication procedure in the future. However, when authentication using the earlier-established authentication procedure is not successful, the authentication server 26 performs a faux enrollment operation to prevent user enumeration.

As described above, improved techniques are directed to enrolling users 32 in new authentication procedures only after the users 32 have authenticated using earlier-established procedures which are at least as strong as the new authentication procedures. For example, if a user 32 wishes to set up a new authentication procedure which requires a password and a facial scan, the user 32 may be required to authenticate using a password and a one-time passcode from a hardware token apparatus 34 in the user's possession prior to facial scan enrollment. Such techniques provide secure processes for enrollment thus preserving the strength of the new authentication procedures. Moreover, the various strengths and security levels associated with different combinations of authentication factors can be easily defined by a set of rules or policies.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the various security strengths for the different authentication procedures were described above as being defined by policies 100 by way of example only. Other ways of defining the security strengths are suitable for use as well such as using weights, applying algorithms/equations, programming, neural networks, fuzzy logic, machine learning, and so on. Such modifications and enhancements are intended to belong to various embodiments of the disclosure.

What is claimed is:

1. A method of operating an authentication system, the method comprising:

receiving, by processing circuitry of the authentication system, an enrollment request to enroll a user in a new authentication procedure in place of an earlier-established authentication procedure, the earlier-established authentication procedure being operative to authenticate the user at a first security level within a range of security levels, the new authentication procedure being operative to authenticate the user at a second security level within the range of security levels, the first security level being at least as high as the second security level within the range of security levels;

in response to the enrollment request, initiating, by the processing circuitry, the earlier-established authentication procedure to authenticate the user;

in response to completion of the earlier-established authentication procedure, performing, by the processing circuitry, an authentication enrollment operation associated with the new authentication procedure; and verifying, by the processing circuitry, that the first security level is at least as high as the second security level, wherein performing the authentication enrollment operation associated with the new authentication procedure is carried out only after successfully verifying that the first security level is at least as high as the second security level.

2. A method as in claim 1 wherein the earlier-established authentication procedure authenticates the user based on a first combination of multiple authentication factors;

wherein the new authentication procedure authenticates the user based on a second combination of multiple authentication factors which is different than the first combination of multiple authentication factors; and wherein initiating the earlier-established authentication procedure includes (i) acquiring the first combination of multiple authentication factors and (ii) providing a first combination authentication result indicating whether the user has successfully authenticated based on the first combination of multiple authentication factors.

3. A method as in claim 2, further comprising:

prior to receiving the enrollment request, inputting security strength policies into the authentication system, the security strength policies defining (i) the range of security levels, (ii) that successful authentication using the earlier-established authentication procedure provides a first security strength within the range of security levels, and (iii) that successful authentication using the new authentication procedure provides a second security strength within the range of security levels, the first security strength being at least as strong as the second security strength within the range of security levels.

4. A method as in claim 3, further comprising:

after performing the authentication enrollment operation associated with the new authentication procedure, receiving an authentication request, and in response to the authentication request, initiating the new authentication procedure to determine whether a source of the authentication request is authentic, the new authentication procedure (i) acquiring, from the source, the second combination of authentication factors and (ii) generating a second combination authentication result indicating whether the source has successfully authenticated based on the second combination of authentication factors.

5. A method as in claim 2 wherein acquiring the first combination of multiple authentication factors includes:

obtaining a user location identifier which identifies a geographic location of the user during performance of the earlier-established authentication procedure, the first combination authentication result being based, at least in part, on the user location identifier which identifies the geographic location of the user during performance of the earlier-established authentication procedure.

6. A method as in claim 5 wherein acquiring the first combination of multiple authentication factors further includes:

obtaining an authentication location identifier which identifies a geographic location of where the earlier-established authentication procedure is performed, the first combination authentication result being based, at least in part, on the authentication location identifier which identifies where the earlier-established authentication procedure is performed.

7. A method as in claim 5 wherein obtaining the user location identifier includes:

receiving global satellite positioning (GPS) data from a GPS circuit of a mobile device in possession of the user, the GPS data identifying the geographic location of the user during performance of the earlier-established authentication procedure.

8. A method as in claim 2 wherein the first combination of authentication factors includes (i) a user identifier which correctly identifies the user among other users, (ii) a current one-time passcode provided by a hardware authentication token apparatus in possession of the user, the current one-time passcode correctly matching an expected one-time passcode associated with the user by the authentication system, and (iii) a current biometric reading which correctly matches an expected biometric reading associated with the user by the authentication system; and wherein providing the first combination authentication result includes:

indicating that the user has successfully authenticated based on the first combination of multiple authentication factors.

9. A method as in claim 2 wherein the first combination of authentication factors includes (i) a user identifier which correctly identifies the user among other users, (ii) a current one-time passcode provided by a hardware authentication token apparatus in possession of the user, the current one-time passcode correctly matching an expected one-time passcode associated with the user by the authentication system, and (iii) a current user location identifier which indicates that the user is currently in a safe location designated by the authentication system; and wherein providing the first combination authentication result includes:

indicating that the user has successfully authenticated based on the first combination of multiple authentication factors.

10. A method as in claim 2 wherein the first combination of authentication factors includes (i) a user identifier which correctly identifies the user among other users, (ii) a current one-time passcode provided by a hardware authentication token apparatus in possession of the user, the current one-time passcode correctly matching an expected one-time passcode associated with the user by the authentication system, and (iii) a current parameter indicating that the user has provided low risk behavior for a predefined amount of time prior to receiving the enrollment request; and wherein providing the first combination authentication result includes:

indicating that the user has successfully authenticated based on the first combination of multiple authentication factors.

11. A method as in claim 2 wherein the first combination of multiple authentication factors includes voice biometrics and does not include face biometrics; and wherein the second combination of multiple authentication factors includes face biometrics and does not include voice biometrics.

12. A method as in claim 2 wherein the second combination of multiple authentication factors includes voice biometrics and does not include face biometrics; and
wherein the first combination of multiple authentication factors includes face biometrics and does not include voice biometrics.

13. A method as in claim 2 wherein the first combination authentication result indicates that the user has unsuccessfully authenticated based on the first combination of multiple authentication factors; and wherein performing the authentication enrollment operation includes:
in response to completion of the earlier-established authentication procedure, performing a faux authentication enrollment operation associated with the new authentication procedure to prevent user enumeration by the authentication system.

14. An electronic apparatus, comprising:
a network interface;
memory; and
control circuitry coupled to the network interface and the memory, the memory storing instructions which, when carried out by the control circuitry, cause the control circuitry to:
receive, through the network interface, an enrollment request to enroll a user in a new authentication procedure in place of an earlier-established authentication procedure, the earlier-established authentication procedure being operative to authenticate the user at a first security level within a range of security levels, the new authentication procedure being operative to authenticate the user at a second security level within the range of security levels, the first security level being at least as high as the second security level within the range of security levels,
in response to the enrollment request, initiate the earlier-established authentication procedure to authenticate the user,
in response to completion of the earlier-established authentication procedure, perform an authentication enrollment operation associated with the new authentication procedure; and
verify that the first security level is at least as high as the second security level,
wherein the instructions further cause the control circuitry to perform the authentication enrollment operation associated with the new authentication procedure only after successfully verifying that the first security level is at least as high as the second security level.

15. An electronic apparatus as in claim 14 wherein the earlier-established authentication procedure authenticates the user based on a first combination of multiple authentication factors;
wherein the new authentication procedure authenticates the user based on a second combination of multiple authentication factors which is different than the first combination of multiple authentication factors; and
wherein the control circuitry, when initiating the earlier-established authentication procedure, is constructed and arranged to (i) acquire the first combination of multiple authentication factors and (ii) provide a first combination authentication result indicating whether the user has successfully authenticated based on the first combination of multiple authentication factors.

16. An electronic apparatus as in claim 15 wherein the electronic apparatus forms at least part of an authentication system; and wherein the instructions, when carried out by the control circuitry, further cause the control circuitry to:
prior to receiving the enrollment request, input security strength policies into the authentication system, the security strength policies defining (i) the range of security levels, (ii) that successful authentication using the earlier-established authentication procedure provides a first security strength within the range of security levels, and (iii) that successful authentication using the new authentication procedure provides a second security strength within the range of security levels, the first security strength being at least as strong as the second security strength within the range of security levels.

17. A computer program product having a non-transitory computer readable medium which stores a set of instructions to operate an authentication system, the set of instructions, when carried out by computerized circuitry, causing the computerized circuitry to perform a method of:
receiving an enrollment request to enroll a user in a new authentication procedure in place of an earlier-established authentication procedure, the earlier-established authentication procedure being operative to authenticate the user at a first security level within a range of security levels, the new authentication procedure being operative to authenticate the user at a second security level within the range of security levels, the first security level being at least as high as the second security level within the range of security levels,
in response to the enrollment request, initiating the earlier-established authentication procedure to authenticate the user, and
in response to completion of the earlier-established authentication procedure, performing an authentication enrollment operation associated with the new authentication procedure; and
verifying, by the processing circuitry, that the first security level is at least as high as the second security level,
wherein performing the authentication enrollment operation associated with the new authentication procedure is carried out only after successfully verifying that the first security level is at least as high as the second security level.

18. A computer program product as in claim 17 wherein the earlier-established authentication procedure authenticates the user based on a first combination of multiple authentication factors;
wherein the new authentication procedure authenticates the user based on a second combination of multiple authentication factors which is different than the first combination of multiple authentication factors; and
wherein initiating the earlier-established authentication procedure includes (i) acquiring the first combination of multiple authentication factors and (ii) providing a first combination authentication result indicating whether the user has successfully authenticated based on the first combination of multiple authentication factors.

19. A computer program product as in claim 18 wherein the method further comprises:
prior to receiving the enrollment request, inputting security strength policies into the authentication system, the security strength policies defining (i) the range of security levels, (ii) that successful authentication using the earlier-established authentication procedure provides a first security strength within the range of security levels, and (iii) that successful authentication using the new authentication procedure provides a second security strength within the range of security levels, the first security strength being at least as strong as the second security strength within the range of security levels.

20. A method as in claim 13, wherein performing the faux authentication enrollment operation includes prompting the user to complete a simulated authentication enrollment operation without revealing to the user that authentication based on the first combination of multiple authentication factors has failed.

21. A method as in claim 20, further comprising:
storing, in the authentication system, an authentication database, the authentication database including multiple entries for respective authentication procedures, each entry including, for a respective authentication procedure, (i) a first field that identifies a combination of authentication factors used for performing that procedure, (ii) a second field that identifies a security strength of that procedure, and (iii) a third field that specifies whether to perform a faux enrollment in response to an unsuccessful authentication using the authentication procedure specified by the respective entry,
wherein performing the faux authentication enrollment operation takes place only after confirming that the third field of the authentication database specifies that a faux authentication enrollment operation is to be performed.

22. A method as in claim 1, further comprising:
receiving, by the processing circuitry, a second enrollment request to enroll a second user in a new authentication procedure in place of an earlier-established authentication procedure for the second user;
comparing a security level of the new authentication procedure indicated by the second enrollment request with a security level of the earlier-established authentication procedure for the second user, and
rejecting the second enrollment request in response to the security level of the new authentication procedure indicated by the second enrollment request exceeding the security level of the earlier-established authentication procedure for the second user.

23. A method as in claim 21, further comprising:
storing, in the authentication system, an authentication database, the authentication database including multiple entries for respective authentication procedures, each entry including, for a respective authentication procedure, (i) a field that identifies a combination of authentication factors used for performing that procedure and (ii) a field that identifies a security strength of that procedure,
wherein verifying that the first security level is at least as high as the second security level includes comparing a value of the security strength field for the new authentication procedure with a value of the security strength field for the earlier-established authentication procedure.

\* \* \* \* \*